United States Patent

Nagamatsu

[15] 3,670,599
[45] June 20, 1972

[54] AUTOMATIC TRANSMISSION CONTROLS

[72] Inventor: Hiroaki Nagamatsu, Hiroshima-shi, Japan

[73] Assignee: Toyo Kogyo Co., Ltd., Aza-Shinchi, Fuchu-cho, Aki-gun, Hiroshima-ken, Japan

[22] Filed: Oct. 8, 1969

[21] Appl. No.: 864,793

[30] Foreign Application Priority Data

Oct. 31, 1968 Japan.....................43/79512

[52] U.S. Cl..............74/869, 74/DIG. 1, 74/753, 192/109 F
[51] Int. Cl.....................B60k 21/02, B60k 29/02
[58] Field of Search..............74/753, DIG. 1, 869; 192/12 C, 192/109 F

[56] References Cited

UNITED STATES PATENTS

| | | | |
|---|---|---|---|
| 3,394,622 | 7/1968 | Chana | 74/DIG. 1 |
| 2,740,304 | 4/1956 | Sheppard | 74/DIG. 1 |
| 2,932,990 | 4/1960 | Cartwright et al. | 74/869 X |
| 3,095,755 | 7/1963 | Duffy | 74/869 X |
| 3,309,939 | 3/1967 | Pierce, Jr. | 74/DIG. 1 |
| 3,494,223 | 2/1970 | Mori | 74/869 X |

Primary Examiner—Carlton R. Croyle
Assistant Examiner—Thomas C. Perry
Attorney—Craig, Antonelli & Hill

[57] ABSTRACT

Automatic transmission controls for use in an automotive vehicle which improves smoothness and reduces pumping losses in automatic shifting by modifying the hydraulic pressure to be applied to friction engaging device in accordance with the torque output of the vehicle engine during normal driving of the vehicle and in accordance with the torque transmitted from the vehicle at the time of engine braking. The controls include a regulator valve operable to extend the operating range to high engine speed and to increase the varying rate at low speed, a timing valve effective to control the engaging time of a servo-motor operated at the low speed, a shift valve being capable to impart hysteresis thereto, and an inhibitor valve being adapted to prevent transmission into the low speed driving condition only if the vehicle driving speed exceeds over a predetermined speed.

3 Claims, 5 Drawing Figures

AUTOMATIC TRANSMISSION CONTROLS

This invention relates to automatic transmission controls for use in an automotive vehicle, and more particularly to an automatic transmission control system for controlling the flow of fluid to friction clutches or brakes for establishing the various driving gear ratios of the transmission.

One important object of the invention is to provide a transmission controls for completely automatic shifting which improves smoothness in such shifting, and for reduction of pumping losses by modifying the hydraulic pressure, namely the line pressure to be applied to friction engaginG devices, such as friction clutches and brakes, in accordance with the torque transmitted. More particularly, this invention has as its object to provide an improved control system for regulating the line pressure by detecting the torque output of the vehicle engine and also the torque transmitted from the vehicle wheels. Namely, in the case where the line pressure is intended to be regulated merely by detecting the torque output of the vehicle engine, the minimum value thereof should be adjusted to the maximum value of the pressure demanded by the friction engaging devices at the time of enGine braking. If the minimum value of the line pressure iS accordingly adjusted thereto, an excessive line pressure will occur against the demanded pressure of the friction engaging devices at the time of normal driving of the vehicle, resulting in the increase of pumping losses or the occurrence of shocks during shifting. For this reason, the invention has as another object to provide a control system for modifying the line pressure in accordance with the torque output of the vehicle engine during normal driving of the vehicle and in accordance with the torque transmitted from the vehicle wheels at the time of engine braking.

A further object of the present invention is to provide a control mechanism which includes means sensitive to the speed of the driven shaft and effective to feed the sensed signal, that is the pressure signal, to a regulator valve for increasing the line pressure in accordance with an increase in the driving speed of the vehicle during the engine braking. The reason for the fact that the above-mentioned object resides in the invention is because the torque transmitted through the vehicle wheels increase with an increase in vehicle speed.

Still a further object of the invention is to provide a control mechanism wherein means responsive to the engine braking conditions are provided for thereby switching on and off the supply of the governor pressure (that is signal pressure representative of the speed of the driven shaft) to the regulator valve.

Yet a further object of the invention is to provide an improved speed regulator valve operable to extend the operating range of governor pressure to substantially higher engine speed than has heretofore been obtainable, and effective to increase the varying rate of the governor pressure at low speed.

Still another object of the invention is to provide a timing valve effective to control the engaging time of a friction engaging device for the low speed ratio during downshifting from a high speed ratio to low speed ratio for varying the sliding time of the timing valve with a value of the governor pressure, that is the vehicle driving speed, by said governor pressure acting on the timing valve.

Yet still another object of the invention is to provide means for varying the area of a governor pressure receiving plane at the high speed driving position and at the low speed driving position in order to impart hysteresis to the shift valve.

Further, another object of the present invention is to provide an inhibitor valve susceptible to the governor pressure on a governor pressure line connected with a shift valve, said inhibitor valve being adapted to prevent transmission into the low speed driving condition only if the vehicle driving speed exceeds a predetermined speed at the time when a manually operable lever forcibly is operated from the high speed driving condition within an automatic shifting range to the lock-up-low range.

These and other objects, features and advantages of the present invention will become more apparent from the following detailed description of the invention when taken with the accompanying drawings, and wherein:

Figure 1:
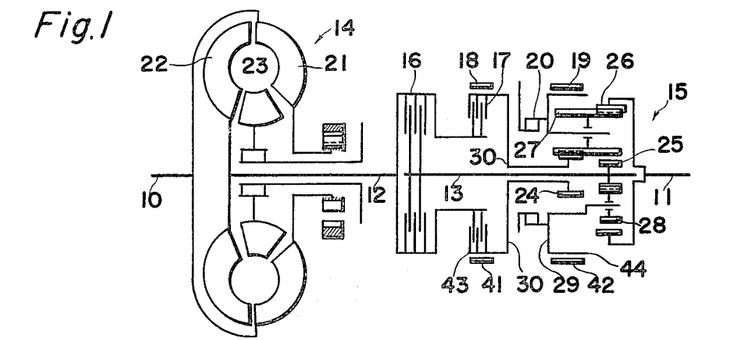
FIG. 1 is a schematic diagram of a transmission mechanism.

Referring initially to FIG. 1, a transmission mechanism which may be incorporated with the control system embodying the present invention comprises a drive shaft 10, a driven shaft 11, a first intermediate shaft 12, and a second intermediate shaft 13, all of said shafts 10 to 13 being coaxially aligned and rotatably disposed within a transmissiOn casing. The transmission mechanism also comprises a torque converter 14, a planetary gear set 15, a front clutch 16, a rear clutch 17, a front brake 18, a rear brake 19, and a one-way brake. The torque converter 14 comprises a pump 21, a turbine 22, and a stator 23.

The planetary gear set 15 comprises a front sun gear 24, a rear sun gear 25, a ring gear 26, a plurality of long pinion gears 27, a plurality of short pinion gears 28, and a gear carrier 29. The front sun gear 24 is formed integrally on a sleeve shaft 30 while the rear sun gear 25 is formed integrally with the second intermediate shaft 13. The ring gear 26 is splined to the driven shaft 11. Both of said sun gears 24 and 25 are adapted to be driven by the first intermediate shaft 12, and the rear sun gear 25 is driven thereby when the front clutch 16 is engaged while the front sun gear 24 is driven thereby when he rear clutch 17 is engaged. The front clutch 16 comprises a plurality of friction plates 31, a spring 32, and a piston 33, and similarly the rear clutch 17 comprises a plurality of friction plates 34, a spring 35, and a piston 36. Each of said pistonS 33 and 36 slidably inserted within respective cavities 37 and 38 is adapted to engage the clutch 16 or 17 when line pressure is supplied to the cavity 37 or 38 through a port 39 or 40. However, when the line pressure is released from the cavity 37 or 38, a spring 32 or 35 acts to return any one of the pinions to release. Each of the brakes 18 and 19 respectively comprises brake band 41 and 42 operatively-fittable to drum 43 or 44 which is formed integrally with the sleeve shaft 30 or the gear carrier 29, respectively.

The transmission illustrated in the drawings provides low, intermediate, and high speed forward drives. When both clutches 16 and 17 and brakes 18 and 19 are disengaged, the transmission is in neutral because no driving torque is transmitted from the drive shaft 10 to the driven shaft 11.

While the transmission is in neutral, the various driving gear ratios can be obtained when the clutches and brakes are engaged in a manner as summarized and tabulated below.

| Speed ratio | Front clutch | Rear clutch | Front brake | Rear brake | One-way brake |
|---|---|---|---|---|---|
| Low | X | | | | X |
| Intermediate | X | | X | | |
| High | X | X | | | |
| Reverse | | X | | X | |
| Lock up low | X | | | X | |

(X marks indicate engagement).

The improved control system of the present invention for the transmission mechanism hereinbefore fully described with reference to FIG. 1 comprises various valves each of which will be hereinafter fully described with reference to FIGS. 2A and 2B.

The regulator valve 50 which includes a piston 52 slidably inserted within a cylinder 51 is adapted to regulate the fluid pressure supplied from an oil reservoir 54 by a pump 53 to a predetermined value. The cylinder 51 is provided with a plurality of ports 55 to 58 and a discharge port 59. The piston 52 is provided with two lands 60 and 61 and a small diameter portion 62 and biased in the right-hand direction by a spring 63. One of the lands 61 has a spacing 64 in its bore, an auxiliary piston 65 is slidably inserted within said spacing 64. Through an orifice 66, said spacing 64 communicates with an annular groove 67 formed between the lands 60 and 61. When the fluid pressure is supplied to the spacing 64 enough to act on a pressure receiving plane 68, the piston 52 is biased in the left-hand direction against the spring 63. Both the land 60 and the small diameter portion 62 have respective pressure receiving planes 69 and 70, respectively. When the fluid pressure is supplied to the port 57 through a conduit 71 and also to the port 58 through a conduit 72, the piston 52 is biased in the right-hand direction. In this arrangement, the fluid pressure supplied by the pump 53 is regulated to a predetermined value through the balance of force acting on the piston 52 at the right and left sides thereof and then supplied as line pressure to a conduit 73 communicating with the port 56. The pump 53 is communicated with the port 55 by a conduit 74.

The manual valve 80 which includes a piston 82 slidably inserted within a cylinder 81 is used to select the various driving conditions. Said cylinder 81 is provided with a plurality of ports 83 to 90 and discharge ports 91 to 93. The piston 82 is provided with a plurality of lands 94 to 98, and between the lands 94 and 95, 95 and 96, 96 and 97, and 97 and 98 are respectively provided with annular grooves 99 to 102. The port 83 is connected with a conduit 73, the port 84 with a conduit 103, the port 85 with a conduit 104, the port 86 with a conduit 105, the port 87 with a conduit 106, the port 88 with a conduit 107, the port 89 with conduit 104, and the port 90 with a conduit 108.

The piston 82 is adapted to be moved into any one of six selective positions P, R, N, D, 2, and 1 wherein P is for parking position, R for reverse drive, N for neutral, D for forward automatic shifting range, 2 for second speed lock-up range, and 1 for first speed lock-up range.

The throttle valve 110 and kick-down valve 111 comprise a throttle valve piston 113 and a kick-down valve piston 114, respectively both slidably inserted within a cylinder 112. The cylinder 112 is provided with a plurality of ports 115 to 120 and discharge ports 121 and 122. The throttle valve piston 113 is provided with an annular groove 125 between lands 123 and 124, and is biased in the left-hand direction by a spring 126. The kick-down valve piston 114 is provided with an annular groove 129 between lands 127 and 128, the left side end thereof being connected to the accelerator (not shown) while a spring 130 is interposed between the right side end of the kick-down valve piston 114 and the throttle valve piston 113 so that the kick-down valve piston 114 is biased in the left-hand direction. The port 115 is connected with the conduit 73, the port 117 with a conduit 131 and the port 116, the port 118 with the conduit 131 through a conduit 133 having an orifice 132, the port 119 with a conduit 135, and the port 120 with a conduit 134. In this arrangement, the throttle valve piston 113 is adapted to be moved in the right-hand direction under the influence of resilient force of the spring 130 as the kick-down valve piston 114 moves in the right-hand direction, resulting in that communication between the port 115 aNd the annular groove 125 is established for supplying the line pressure from the port 115 to the conduits 72 and 131 as a throttle pressure. The kick-down valve piston 114 is adapted to communicate the port 119 with the port 120 when the accelerator pedal is in normal position and to cut off the communication therebetween when the accelerator pedal is in kick-down position. In other words, the throttle valve 110 is adapted to generate the throttle pressure in proportion to the pedalling position of the accelerator while the kick-down valve 111 is adapted to cut off the flow of fluid supplied from the conduit 134 to the conduit 135 and communicate the conduit 135 with the discharge port 121 when the accelerator pedal is in kick-down position.

The governor valve 140 which includes a first casing 141 and second casing 142 is secured to the driven shaft 11 so as to rotate therewith to convert the centrifugal force acting thereto into the fluid pressure, that is, governor pressure. The first casing 141 comprises a small diameter portion 146 and a large diameter portion 147 and is provided with inlet port 143, outlet port 144 and a discharge port 145. The first casing 141 also includes a first piston 148 slidably inserted in the interior thereof. The first piston 148 is provided with a small diameter land 149 and a large diameter land 150 respectively coincident with the small diameter portion 146 and the large diameter portion 147 in said first casing 141, and with annular groove 151 between said lands 149 and 150. This piston 148 is also normally biased by a spring 152 in the same direction where the centrifugal force is effected. The second casing 142 is provided with ports 153 to 156 and a discharge port 157 and a second piston 158 is slidably inserted within said casing. The second piston 158 is normally biased by a spring 159 in the opposite direction where the centrifugal force is effected. Said port 143 is connected with the conduit 103, the port 144 with the port 153 through a conduit 160, the port 154 with the port 155 through a conduit 161, and the port 156 with a conduit 162. In this arrangement, the line pressure supplied to the port 143 flows into the annular groove 151. When the driven shaft 11 is in non-operation at this time, the first governor pressure to be supplied to the port 144 is maintained at the point A as shown in FIG. 3 through the balance pressing forces, one of which is effected to inwardly press the piston 148 by means of the pressure acting on the land 150 and the other of which is effected to outwardly press the piston 148 by means of the spring 152. When the driven shaft 11 is rotated in such a manner that the centrifugal force is subsequently generated to act on the piston 148, the first governor pressure will increase in proportion to the centrifugal force acting on the piston 148 in a manner such as a curve A to B in FIG. 3. The first governor pressure thus regulated is supplied to the port 153 of the second casing 142 through the conduit 160 to cause the second piston 158 to be outwardly (downwardly in view of FIG. 2) pressed, and then flows into the conduit 161 to act on the outer end of the second piston to cause the second piston to be pressed inwardly. In this case, so long as the rotational velocity of the driven shaft 11 is within the range of zero to the point P in FIG. 3, the first governor pressure to be supplied to the conduit 160 is maintained through the balance of pressing forces, one of which is effected to outwardly press the second piston 158 by meanS of the first governor pressure and the centrifugal force acting on the inner end of the second piston and the other of which is effected to inwardly press the second piston by means of the pressure acting on the outer end of the second piston 158 and the spring 159. Subsequently the first governor pressure is supplied as a second pressure. However, when pressure to the conduit 162 through the conduit 161, the ports 155 and 156, which is in turn supplied to other control sections. The second governor pressure within the range of zero to the point P is equivalent to the first governor pressure reduced by the second piston 158, the reduced amount of which will decrease with increase in the centrifugal force acting on the second piston in a manner such as illustrated by a curve C to D in FIG. 3. In this condition, when the rotational velocity of the driven shaft 11 reaches to the point P and subsequently the balance is established between the resilient force of the spring 159 and the centrifugal force acting on the piston 158, the reduction of the first governor pressure by the second piston 158 ceases and at the same time the first governor pressure becomes equivalent to the second governor pressure. However, when the rotational velocity of the driven shaft exceeds over the point P the second governor pressure to be supplied to the conduit 162 will vary as shown by a curve D to B in FIG. 3.

Accordingly, the variation rate of the second governor pressure supplied to the conduit 162 will be high in low speed range and will be low in high speed range. For this reason, the governor pressure can be varied within the range up to high speed rotation of the driven shaft and effective to control the automatic tranSmission.

Heretofore, an automatic transmission mechanism of the conventional type is provided with a shift valve for changing the gearing ratios of the multi-stage power transmitting train. In this case, in order to operate on and off the shift valve in accordance with variation of the vehicle driving speed and the torque output of the vehicle engine, the governor pressure in proportion to the rotational velocity of the shaft or the vehicle driving speed, and the pressure or the throttle pressure in proportion to the torque output of the vehicle engine are effected against the shift valve, whereby the change of the gearing ratios of the power transmitting train takes place in accordance with respective variations of these pressures. For this reason, it is preferable that the governor pressure regulated by the oil pressure governor is greatly varied within the whole range of rotation of the driven shaft in which the change of the gearing ratios of the power transmitting train can be obtainable. However, the oil pressure governor of this character has been adapted to convert the centrifugal force accompanied with rotation of the driven shaft into a hydraulic pressure or governor pressure and thereafter to adjust the line pressure in proportion to the centrifugal force. Therefore, the characteristics of the governor pressure indicates that the amount of variation within low speed range is small compared to within high speed range and the maximum value thereof is limited by the line pressure capacity.

If the variation rate of governor pressure is designed to be high in the whole range of governor pressures in order to make large the amount of variation thereof within the low speed range, the governor pressure will be the same as the line pressure, which is the maximum pressure of the governor pressure before the maximum variable vehicle speed is attained and the change-over of the shift valve by means of the governor valve cannot be efficiently performed at about high speed change. On the contrary if the variation rate of the governor pressure is designed low in order to vary the governor pressure with variation of the maximum variable vehicle speed, the amount of variation within low speed range become small and the shift valve cannot accurately be operated at the predetermined vehicle speed with the governor pressure set for low speed range.

Therefore, so long as the governor pressure is regulated to increase quickly in low rotational speed range and to decrease the rate of variations in high rotational speed range as hereinbefore described in conjunction with the present invention, an accurate operation of the shift valve can be appreciated.

The 1-2 shift valve 170 comprises a first piston 172, a second piston 173, and plug 174, all of them being slidably inserted within a cylinder 171 provided with a plurality of ports 175 to 189 and discharge ports 190 and 191. The port 175 is connected with the conduit 108, the ports 176 and 178 with the conduit 135, the port 177 with a conduit 192, the port 179 with a conduit 193, the ports 180 and 182 with the conduit 134, the port 181 with a conduit 194, the port 183 with a conduit 195, the port 184 with an apply chamber 198 in a first sevomotor 197 through a conduit 196, the port 185 with the conduit 103, the port 186 with the conduit 106, the port 187 with an apply chamber 201 in a second servomotor 200 through a conduit 199, the port 88 with the conduit 131, and the port 189 with a conduit 213. The first piston 172 is provided with lands 203 to 206 together with annular grooves 207 208, and 209 between 203 and 204, 204 and 205, and 205 and 206 respectively, and is normally biased to the left by the spring 202. The land 203 is formed larger in diameter than the land 204 so that, when the governor pressure supplied through the ports 180 and 182 at the time of the illustrated conditions acts on the both ends of the land 203 and the left-hand end of the land 204, the pressing force effective to press the first piston 172 in the right-hand direction by means of the governor pressure can be attained by the following formula: $\{(A_1 + A_3) - A_2\} \times Pg$
wherein $A_1$ is an area of the pressure receiving portion of the left-hand end of the land 203, $A_3$ is an area of the pressure receiving portion of the left-hand end of the land 204, $A_2$ is an area of the pressure receiving portion of the right-hand end of the land 203, and Pg is the governor pressure.

The second piston 173 is provided with a large diameter land 210 and a small diameter land 211 and with annular groove 212 therebetween, and similarly when the governor pressure supplied through the ports 176 and 178 at the time of the illustrated conditions in the same way as the first piston 172 acts on the both ends of the large diameter land 210 and the left-hand end of the small diameter land 211, the pressing force effective to press the second piston 173 in the right-hand direction can be attained by the following formula: $\{(A_4 + A_6) - A_5\} \times Pg$
wherein $A_4$ is an area of the pressure receiving portion of the left-hand end of the large diameter land 210, $A_6$ is an area of the pressure receiving portion of the left-hand end of the small diameter land 211, $A_5$ is an area of the pressure receiving portion of the right-hand end of the large diameter land 210, and Pg is the governor pressure. The first piston 172 and the second piston 173 are respectively provided with low speed driving position and high speed driving position. When the both pistons are positioned at the low speed driving position, the port 185 being supplied line pressure via the conduit 103 is closed by the land 205 and the port 184 commences to communicate with the discharge port 191.

On the contrary, when the both pistons are positioned at the high speed driving position, the port 185 is communicated with the port 184 and the ports 178 and 179 are respectively closed of their communication with the corresponding ports 182 and 183 by the lands 210 and 203 while the annular grooves 212 and 207 are respectively communicated with the discharge ports 190 and 191. Shift from the low speed driving position to the high speed driving position can be performed by means of change in balance between the governor pressure acting on the left-hand ends of the first piston 172 and second piston 173 and the throttle pressure acting on the right-hand end of the first piston 172. When the first piston 172 and second piston 173 are positioned at the low speed driving position, the pressing force effective to press the first piston 172 and second piston 173 in the right-hand direction by means of the governor pressure acting on the both ends of the lands 210 and 203 and the left-hand ends of the lands 211 and 204 is in balanced condition with the pressing force effective to press the first position 172 in the left-hand direction by the resilient force of the spring 202 and the throttle pressure. On the contrary, when they are positioned at the high speed driving position, the pressing force effected so as to press the first piston 172 and the second piston 173 in the right-hand direction by means of the governor pressure acting on the left-hand ends of the lands 210 and 203 is in balanced condition with the pressing force effected so as to press the second piston 173 in the left-hand direction through the first piston 172 by the resilient force of the spring 202 and the throttle pressure. In other words, compared with the low speed driving position, the high speed driving position is adapted to cause a pressure receiving area of land 210 to increase for pressing the piston in the right-hand direction by means of the governor pressure effected thereto. The reason for this results from the fact that the ports 178 and 182 are respectively closed of their corresponding communication by the lands 210 and 203 upon shift of the first piston 172 and second piston 173 from the low speed driving position to the high speed driving position, whereby the pressing force effected so as to press the pistons in the left-hand direction decreases sufficient enough to cause the first piston 172 and second piston 173 to respectively move quickly into the high speed driving position resulting in that the time of shift from low speed driving position to high speed driving position is thus changed as compared with the time of the shift from high speed driving position to low speed driving position under the same driving conditions. In other words, the first piston 172 and second piston 173 are respectively imparted with hysteresis for preventing complicated shifts of the pistons. In addition, the second piston 173 is adapted to shift the first piston 172 from high speed driving position to low speed driving position upon positioning of the kick-down valve 111 at the kick-down position. Thus, when the kick-down valve piston 114 is moved to position at the kick-down position and the governor pressure within the conduit 135 is subsequently discharged to the discharge port 121, the pressing force effected so as to press the first piston 172 in the right-hand direction by means of the governor pressure acting against the second piston 173 decreases sufficient enough to shift the first piston 172 to the low speed driving position. The plug 174 is adapted to move in the right-hand direction by line pressure supplied from the conduit 108 upon operation of the manual valve 80 at a "second gear drive," to cause the second piston 173 and first piston 172 to be respectively shifted to high speed driving position and thereafter communication between the ports 185 and 184 is established and maintained.

The 2–3 shift valve 220 includes a first piston 222 and a second piston 223, both being slidably inserted within a cylinder 221. The cylinder 221 is provided with ports 224 to 232 and discharge ports 233 and 234 in which the port 224 is connected with a conduit 192, the port 225 with a conduit 193, the port 226 with a conduit 194, the port 227 with a conduit 195, the port 228 with the conduit 107, the port 229 with the conduit 105, the port 230 with a conduit 213, the port 231 with a conduit 235, and the port 232 with a conduit 236. The conduit 236 is connected to the cavity 38 in the rear clutch 17 and also to a release chamber 239 in the first servomotor 197 through a check valve 237 interposed on a branch conduit 238.

The first piston 222 is provided with lands 240 to 243 and normally biased to the left by a spring 244. Between these lands 240, 241, and 242 are provided annular grooves 245 and 246. The land 240 is designed larger in diameter than the land 241 in order that the first piston 222 may be pressed in the left-hand direction under the influence of the governor pressure supplied to the annular groove 245 through the port 227.

The second piston 223 is provided with lands 247 and 248 and with an annular groove 249 therebetween. The land 247 is designed larger in diameter than the land 248 so that the second piston 223 may be pressed in the left-hand direction under the influence of the governor pressure supplied to the annular groove 249 through the port 225.

The 2–3 shift valve 220 thus designed is actuated by the governor pressure and the throttle pressure in the same manner to the above mentioned 1–2 shift valve 170 with respect to the low speed driving position and the high speed driving position, the operational modes of said 2–3 shift valve 220 being similar to that of the 1–2 shift valve 170.

The timing valve 260 comprises a piston 262 and a plug 263, all of them being slidably inserted within a cylinder 261 and is adapted to control the timing of downshift from third speed ratio to second speed ratio.

In operation to down-shift, the wheel rotating velocities before and after shifting takes place must be substantially equalized with each other. For this purpose, it is necessary to temporarily maintain the transmission in neutral condition to increase the rotational speed of the vehicle engine up to a value corresponding to the speed ratio between the driven and drive shafts or the gearing ratio at the condition after the downshift is effected and thereafter engage the friction engaging members for the low speed side under this condition. If the engagement of the friction engaging members for the low speed side is effected under the condition of the speed ratio before the downshift, the operator of an automotive vehicle will then be subjected to discomfortable feeling as may occur during the engine braking because the velocity of the wheels decreases while the operator intends to accelerate by stepping on the pedal of the accelerator.

A range of increase of the engine speed varies with the running speed of vehicle, and so this fact must be taken into consideration. The timing valve of this type is provided for the above mentioned purpose to be achieved. The cylinder 261 is provided with ports 264 to 268 in which the port 264 is connected with the conduit 194, the port 265 with a conduit 238, the port 266 with a conduit 236, the port 267 with the conduit 235 through a orifice 269, the port 268 with the conduit 106. The piston 262 is provided with lands 270 and 271 and with an annular groove 272 therebetween, and normally biased to the left by the resilient force of a spring 273 interposed between the piston 262 and the plug 263.

The plug 263 is adapted to move in the left-hand direction under the influence of the line pressure supplied from the conduit 106 when the manual valve 80 is positioned at first, second and reverse drive positions. As the plug 263 moves in the lefthand direction, the piston 262 is maintained in a condition as illustrated in FIG. 2 A and the ports 265 and 266 and the annular groove 272 are communicated one another.

The inhibitor valve 280 is adapted to prevent the downshift to the low driving position which may be manually performed by the operator under the condition of exceeding over an allowable value of the engine speed. This inhibitor valve 280 includes a piston 282 slidably inserted within a cylinder 281. The cylinder 281 is provided with ports 283 to 285 and a discharge port 286, in which the port 283 is connected with the conduit 162, the port 284 with the conduit 134, and the port 285 with the conduit 105. The piston 282 is provided with lands 287 and 288 and with an annular groove 289 therebetween and normally biased to the right by the resilient force of a spring 290. The land 287 is formed larger in diameter than the land 288 so that the piston 282 may be pressed in the left-hand direction under the influence of the governor pressure supplied to the annular groove 289, and has two positions at the right and the left. Shift of the piston from right position to left position takes place under the influence of line pressure to be supplied from the port 285 and against the resilient force of the spring 290, said line pressure being due to be supplied thereto when the manual valve 80 is positioned at D-position of forward automatic shifting range. In other words, when the manual valve 80 is positioned at the D-position, the piston 282 is moved by the line pressure in the left-hand direction, while when the manual valve 80 is positioned at other positions, the piston 282 is maintained to the right position under the influence of the resilient force of the spring 290. In practice, when the piston is in the left position, the ports 283 and 284 are communicated with each other and the discharge port 286 is closed of its communication by the land 288. At the same time, the governor pressure supplied through the conduit 162 is supplied to the 1–2 shift valve 170, 2–3 shift valve 220 and the timing valve 260 respectively through the conduits 134, 194 and 195. On the contrary when the piston 282 is positioned at the right position, the port 283 is closed of its communication by the land 287 while the port 284 is communicated with the discharge port 286.

The on-off valve 300 is adapted to detect the entirely closed condition of the accelerator, and includes a piston 302 slidably inserted within a cylinder 301. The cylinder 301 is provided with ports 303 to 305 and a discharge port 310. The port 303 is connected with the conduit 72, the port 304 with the conduit 162, and the port 305 with the conduit 71. The piston 302 is provided with lands 306 and 307 and with an annular groove 308 therebetween. This person 302 will be moved to the left position by the spring 309 while the throttle pressure to be supplied through the port 303 is substantially zero. On the contrary, while the throttle pressure is substantially generated, the piston 302 will be moved to the right position. When the piston 302 is in the left position, the port 304 is communicated with the port 305 through the annular groove 308 and the discharge port 310 is closed of its communication by the land 307. At the same time, the governor pressure supplied through the conduit 162 is then supplied to the regulator valve 50 through the conduit 71. On the contrary, when the piston 302 is in the right position, the port 304 is closed of its communication by the land 306 and the port 305 commences to communicate with the discharge port 310. The operation of the system is described for the various positions of the manual valve 80 in the following paragraphs.

A. Neutral condition

Figures 2, 2A, 3:
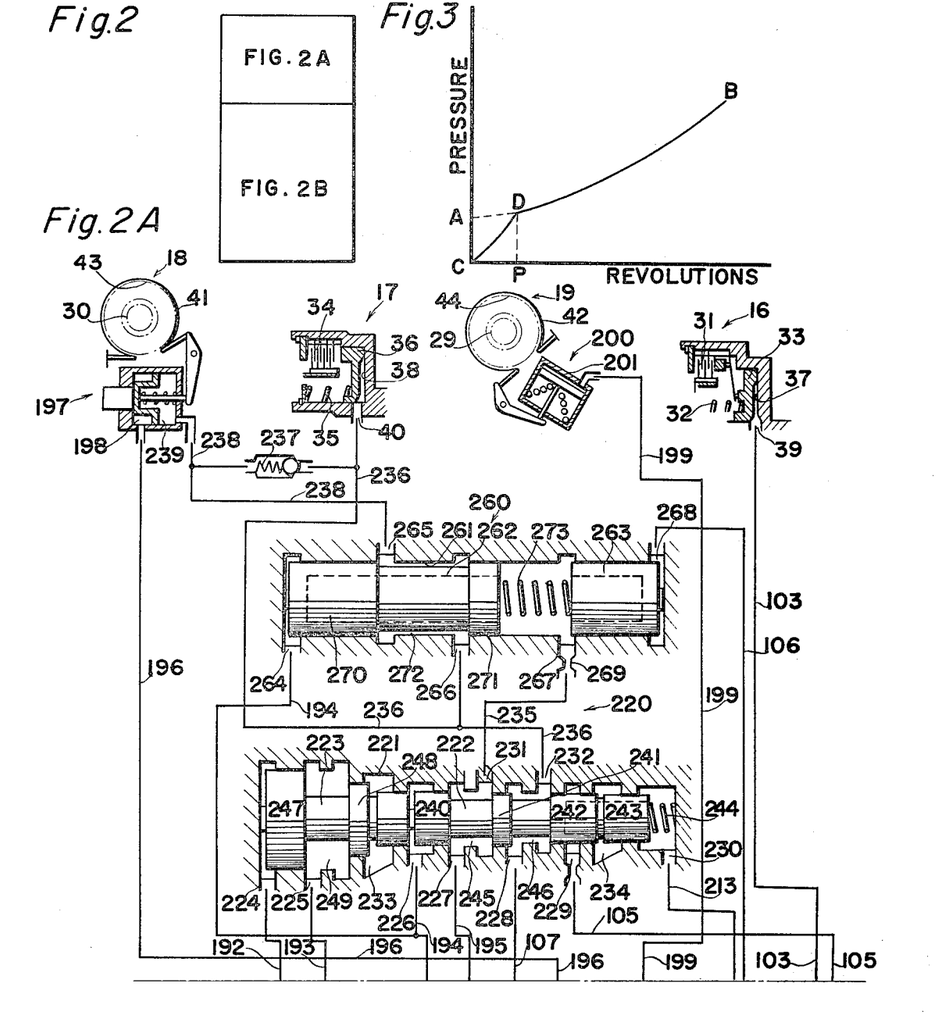
FIG. 2 is a reference layout diagram for combining FIGS. 2A and 2B.
FIGS. 2A and 2B show a schematic diagram of the complete control system for the transmission mechanism in accordance with the invention showing essential parts in section.
FIG. 3 is a graph illustrating the output pressure provided by the governor valve as a function of speed of revolutions provided by the drive shaft.
Figure 2B:
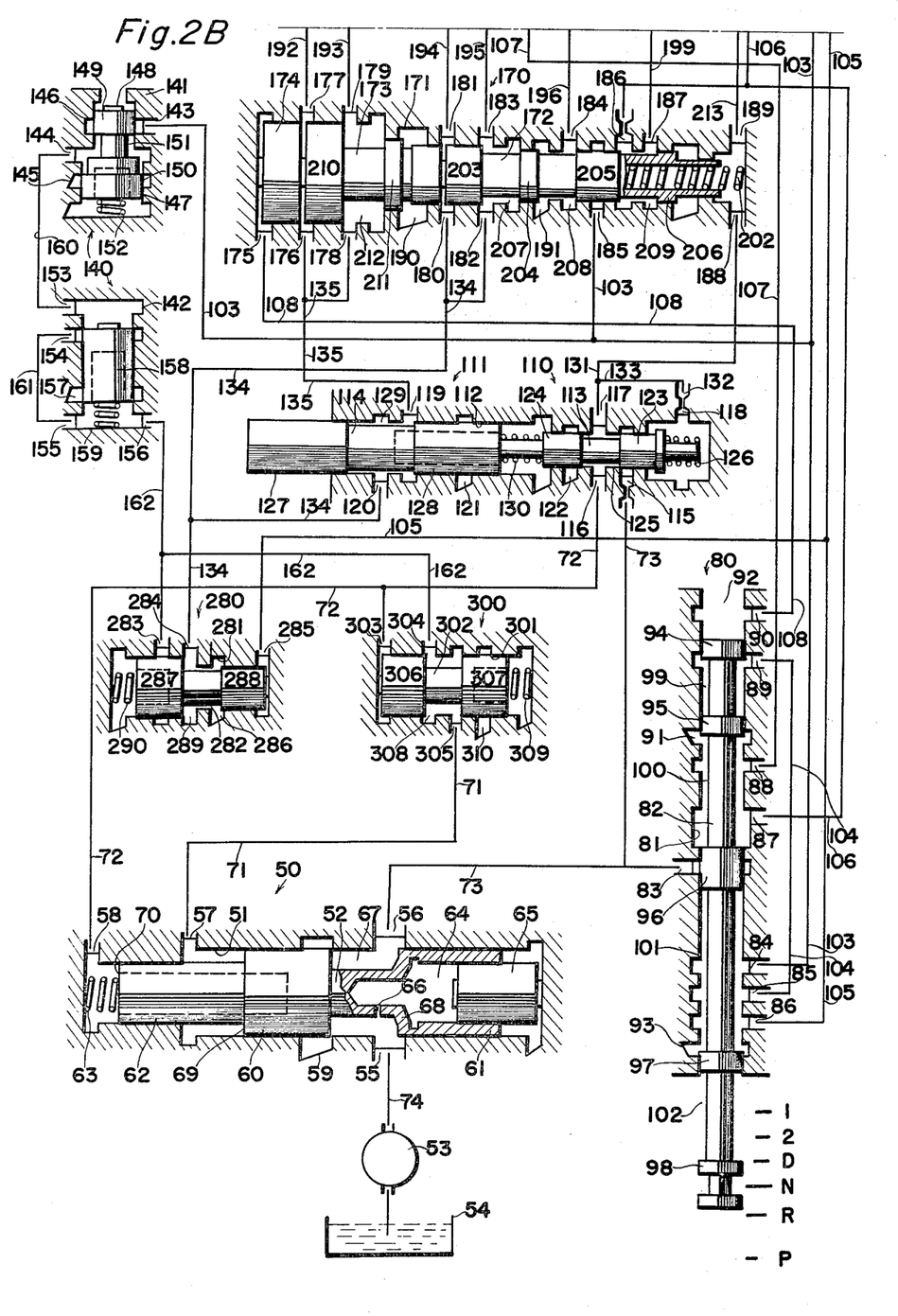

When the manual valve 80 is in the N position or neutral, all of the valves are in respective conditions as illustrated in FIG. 2. At this time, as the vehicle engine is operated, then the oil pump 53 is actuated to supply oil from the reservoir 54 to the conduit 74 which is in turn supplied to the spacing 64 through the port 55, the annular groove 67 and the orifice 66 of the piston 52. The fluid thus supplied into the spacing 64 then acts on the pressure receiving plane 68 to press the piston 52 in the left-hand direction. In the case where the automotive vehicle is parked with its throttle unopened at this time, the fluid under output pressure supplied by the pump through the port 55 is regulated to the pressure of a predetermined value through the balance of the pressing forces, one of which is effected so as to press the piston 52 in the left-hand direction by the fluid acting on the pressure receiving plane 68 and the other of which is effected by the spring 63 so as to press the piston 52 in the right-hand direction, and then supplied to the conduit 73 as a line pressure. This line pressure thus supplied is further supplied respectively to the port 83 for the manual valve 80 and the port 115 for the throttle valve 110. When the accelerator pedal is depressed by the operator at this time, the kick-down valve piston 114 is directly moved in the right-hand direction in accordance with the amount of the depression of the accelerator pedal to compress the spring 130 resulting in the shift of the piston 113 in the right-hand direction. Accordingly, closing of the port 115 being engaged with the land 123 is released and the port 115 commences to communicate with the annular groove 125 whereby a portion of the line pressure supplied from the port 115 is supplied into the annular groove 125 as throttle pressure. This throttle pressure may increase in proportion to the pressing force for pressing the throttle valve piston 113 in the right-hand direction. If the pressing force on the piston 113 in the left-hand direction under the influence of the throttle pressure supplied from the port 118 and the resilient force of the spring 126 becomes greater than that for pressing it in the right-hand direction, then the piston 113 is moved in the left-hand direction to cut off the flow of line pressure with the port 115 closed by the land 123 while the discharge port 122 is communicated with the annular groove 125 by the land 124 so that an excessive fluid is discharged. On the contrary, if the pressing force for pressing the piston in the left-hand direction becomes smaller than that for pressing it in the right-hand direction, then the piston 113 is moved in the right-hand direction to permit the flow of the line pressure into the annular groove 125. Thus, through repetition of such operational mode as above mentioned, the regulating effect for the throttle pressure can be maintained in view of the predetermined value. The throttle pressure thus regulated is supplied to the conduit 72 and the conduits 131 and 213 respectively through the ports 116 and 117 which is in turn supplied therethrough respectively to the port 58 in the regulator valve 50, the port 188 in the 1–2 shift valve 170 and the port 230 in the 2–3 shift valve 220 to cause each of the respective pistons of these valves to press in one direction, respectively.

In such a manner, the throttle pressure is supplied to the regulator valve 50 sufficient enough to press the piston 52 in the right-hand direction. At this time, the line pressure supplied to the conduit 73 is regulated through the balance of the pressing forces, one of which is effected so as to press the piston 52 in the left-hand direction by means of line pressure acting on the pressure receiving plane 68 and the other of which is effected so as to press the piston 52 in the right-hand direction by means of the throttle pressure and the resilient force of the spring 63.

In other words, the line pressure will increase with increase of the throttle pressure.

B. D-positioned Manual Valve . . . from idling to start in first gear

As the manual valve 80 is operated to position at the D-position from the neutral condition, the port 83 is communicated to the annular groove 101 and the discharge port 93 is closed by the land 97. Accordingly, line pressure supplied through the port 83 is supplied to the conduits 103, 104, and 105 respectively through the ports 84, 85 and 86. The line pressure supplied to the conduit 103 is then supplied respectively to the port 185 in the 1–2 shift valve 170, the port 143 in the governor valve 140 and the cavity 37 in the front clutch 16, the line pressure thus supplied to the conduit 104 being supplied to the port 89 in the manual valve 80, the line pressure thus supplied to the conduit 105 being supplied respectively to the port 285 in the inhibitor valve 280 and the port 229 in the 2–3 shift valve 220.

Subsequently, the front clutch 16 is engaged, a portion of the line pressure supplied through the port 143 flows into the annular groove 151 and is converted into first governor pressure by the piston 148, which is in turn supplied to the conduit 160. Subsequently, the ports 283 and 284 in the inhibitor valve 280 are communicated with each other as the piston 282 moves in the left-hand direction. In this case, since the ports 185 in the 1–2 shift valve 170 and the port 229 in the 2–3 shift valve 220 are closed respectively by the lands 205 and 242, no line pressure is supplied respectively to the ports 184 and 232.

As the front clutch 16 is engaged in such a manner, the one-way brake is also engaged to cause the rear sun gear 25 to serve as input member and the drive power generated by the vehicle engine is transmitted to the rear sun gear 25 successively through the drive shaft 10, the torque converter 14, the first intermediate shaft 12, and the second intermediate shaft 13. Under the influence of the revolution of this rear sun gear 25, the long pinion gears 27 commence to self-rotate on the front sun gear 24 through the short pinion gears 28, and the rotational power therefrom is then transmitted to the driven shaft 11 through the ring gear 26, resulting in that the automotive vehicle is driven under low speed gear.

C. D-Positioned Manual valve . . . from first gear to second gear

Thus, when the automotive vehicle is driven at the low speed gear, the governor valve 140 rotates together with the driven shaft 11 sufficient enough to produce centrifugal forces therefrom respectively acting on the first piston 148 and second piston 158 to move them in the outward direction. Then, the first governor pressure thus produced proportionally increases with increase of the centrifugal force acting against the first piston 148 while the centrifugal force acting on the second piston 158 causes the piston 158 to outwardly slide to communicate the port 153 with the port 154 so that the second governor pressure may be produced in the conduit 161. This second governor pressure is then supplied to the port 120 in the kick-down valve 111 and the ports 180 and 182 in the 1–2 shift valve 170 respectively through the ports 155 and 156, the conduit 162, the ports 283 and 284 in the inhibitor valve 280 and the conduit 134.

Now assuming that the 1–2 shift valve 170 is in condition as illustrated in FIG. 2 B and the kick-down valve 111 is also in near condition as illustrated, the second governor pressure supplied to the ports 180 and 182 in the 1–2 shift valve 170 is then supplied to the port 226 in the 2–3 shift valve 220 and the port 264 in the timing valve 260 respectively through the port 181 and the conduit 194, which is in turn supplied to the port 227 in the 2–3 shift valve 220 by means of the port 183 through the conduit 195. The second governor pressure is further supplied from the port 227 to the port 267 in the timing valve 260 through the port 231 along the conduit 235 and the orifice 269. The second governor pressure supplied to the port 120 in the kick-down valve 111 is supplied to the ports 176 and 178 in the 1–2 shift valve 170 through the annular groove 129, the port 119 and along the conduit 135, which is in turn supplied to the ports 224 and 225 in the 2–3 shift valve 220 respectively through the port 177, the conduit 192, and the port 179, the conduit 193. As the second governor pressure is thus supplied, the first pistons 172 and 222 and the second pistons 173 and 223 respectively of the 1–2 shift valve 170 and the 2–3 shift valve 220 are pressed in the right-hand direction, and thereby the piston 262 and the plug 263 in the timing valve 260 are maintained in condition as illustrated in FIG. 2 A.

When the driving speed of the automotive vehicle reaches to a predetermined value under this condition and the second governor pressure acting on each of the lands of the first piston 172 and the second piston 173 in the 1–2 shift valve 170 subsequently increases to an extent sufficient enough to cause the first piston 172 and the second piston 173 to move in the right-hand direction on the throttle pressure and the resilient force of the spring 202 for pressing the first piston 172 and the second piston 173 in the left-hand direction, the first piston 172 and the second piston 173 are transferred to the high speed driving position that is, to the right. During this transference to the high speed driving position, as the ports 182 and 178 are respectively closed by the lands 203 and 210 while the annular grooves 207 and 212 are communicated with the discharge ports 191 and 190, the pressing force effected on the right-hand ends of the lands 203 and 210 so as to move the first piston 172 and the second piston 173 in the left-hand direction becomes zero, resulting in that operating areas of the left-hand ends of the lands 203 and 210 increase to an extent sufficient enough to promptly move the first piston 172 and the second piston 173 in the right-hand direction. By this transference of the first piston 172 to the high speed driving position, the discharge port 191 is closed by the land 204 while the ports 184 and 185 are communicated with the annular groove 208. Accordingly, line pressure in the conduit 103 is supplied to the apply chamber 198 in the first servomotor 197 through the port 185, the annular groove 208, the port 184 and the conduit 196, to press the piston in the right-hand direction. Thus, the front brake 18 is actuated to establish the intermediate speed driving condition.

D. D-Positioned Manual Valve . . . from second gear to third gear

Further, when the vehicle driving speed is increased and the second governor pressure acting on each of the lands of the first piston 222 and second piston 223 in the 2–3 shift valve 220 subsequently increases to an extent sufficient enough to cause the first piston 222 and second piston 223 to move in the right-hand direction against the throttle pressure and the resilient force of the spring 244 for pressing the first piston 222 and second piston 223 in the left-hand direction, the first piston 222 and second piston 223 are transferred to the high speed driving position, that is to the right. Since the pressing force by means of the second governor pressure for pressing the pistons in the left-hand direction decreases, during this transference to the high speed driving piston as similar to the 1–2 shift valve 170, the first piston 222 and the second piston 223 are promptly moved to the high speed driving position. As the pistons 222 and 223 move to the high speed driving position, the port 229 is communicated with the port 232 through the annular groove 246, whereby line pressure supplied through the conduit 105 is supplied to the conduit 236 through the port 229, the annular groove 246 and the port 232 which is in turn supplied to the cavity 38 through the port 40 in the rear clutch 17. At the same time, a portion of the line pressure is supplied to the release chamber 239 in the first servomotor 197 through the check valve 237 along the conduit 238. By the transference of the 2–3 shift valve 220 to the high speed driving position, the port 227 is closed by the land 240 while the port 231 is communicated with the port 228 connected with the port 88 and the discharge port 91 in the manual valve 80 through the conduit 107 so that the second governor pressure acting on the right-hand end of the piston 262 in the timing valve 260 is discharged from the discharge port 91 successively through the port 267, the orifice 269, the conduit 235, the port 231, the annular groove 245, the port 228, the conduit 107 and the port 88 in the manual valve 80. Therefore, the piston 262 is moved in the right-hand direction under the influence of the second governor pressure acting on the left-hand end of the piston 262 and the port 265 is subsequently closed by the land 270.

In such a manner, the front brake 18 is released and the rear clutch 17 is engaged to establish the high speed driving, that is third gear.

E. Kick-down . . . from third gear to second gear

The kick-down operation from third gear to second gear will be hereinafter described. When under the third gear the accelerator pedal is fully stepped on to cause the kick-down valve piston 114 to greatly move in the right-hand direction and thereby to close the communication of the port 120 by means of the land 127 while to communicate the port 119 with the discharge port 121, the second governor pressure acting on the left-hand ends of the lands 247 and 210 of the second pistons 223 and 173 respectively in the 2–3 shift valve 220 and the 1–2 shift valve 170 is discharged from the discharge port 121 through the port 224, the conduit 192, the ports 177 and 176, the conduit 135, and the port 119 so that the pressing forces respectively for pressing the first pistons 222 and 172 in the right-hand direction are considerably decreased. Moreover, since the throttle pressure acting on the right-hand ends of the first pistons 222 and 172 to press them to the low speed driving positions may reach to the maximum value through the full depression of the accelerator pedal, the pressing force effective to maintain the first pistons 222 and 172 at the high speed positions is further decreased. If the vehicle speed is in the condition where the downshift from the high speed driving position to the intermediate driving position can be effected, namely within the range of kick-down from the third gear to the second gear, the first piston 222 and second piston 223 in the 2–3 shift valve and the second piston 173 in the 1–2 shift valve are moved in the left-hand direction by the governor pressure acting on the right-hand ends of each of the second pistons 223 and 173, the resilient force of the spring 244 effective to press the first piston 222 in the left-hand direction and the throttle pressure, while the first piston 172 in the 1–2 shift valve remains at the same state not to move in the left-hand direction. In other words, within the range of kick-down from the third gear to the second gear where the vehicle runs at considerably high speed and the second governor pressure is great, the throttle pressure for pressing the first piston 172 in the left-hand direction is insufficient enough to overcome the pressing force for pressing the first piston 172 in the right-hand direction by the second governor pressure to press the first piston 172 in the left-hand direction, so that the first piston 172 is maintained at the high speed driving position.

In such a manner, when the first piston 222 2–3 shift valve 220 is transferred to the low speed driving position, the port 232 is communicated with the port 228 communicating to the discharge port 91 in the manual valve 80 so that line pressure within the cavity 38 in the rear clutch 17 is discharged from the discharge port 91 through the conduit 236, ports 232 and 228 in the 2–3 shift valve 220, the conduit 107 and the port 88 in sequential order to release the clutch 17. At the same time, since the port 231 is communicated with the port 227, the second governor pressure is supplied from the conduit 195 to the right-hand end of the piston 262 in the timing valve 260 through the ports 227 and 231, the conduit 235 and the orifice 269 in sequential order to press the piston 262 in the left-hand direction. In this case, since the second governor pressure is supplied through the orifice 269, the oil pressure in a spacing defined between the right-hand end of the piston 262 and the left-hand end of the plug 263 relative to border on the orifice 269 is delayed of their respective increase in comparison to that of the conduit 235. Subsequently, when the second governor pressure within said spacing becomes substantially equal to the second governor pressure within the conduit 235 or the conduit 194, the piston 262 commences to move in the left-hand direction to communicate the port 265 with the port 266 through the annular groove 272 for remitting a line pressure within the release chamber 239 in the first servomotor 197 to discharge from the discharge port 91 in the manual valve 80 through the conduits 238 and 236. In such a manner, the line pressure within the release chamber 239 being thus discharged, the piston of the first servomotor 197 is moved in the right-hand direction under the influence of the line pressure supplied in the apply chamber 198 resulting in the engagement of the front brake 18.

Thus, after the rear clutch 17 is released and the timing valve 260 is moved to the left, the front brake 18 is engaged under the influence of the line pressure supplied in the apply chamber 198 of the first servomotor 197 to establish the intermediate speed driving position. In other words, the orifice 269 and the timing valve 260 are adapted to delay the engagement of the front brake 18 whereby the transmission mechanism is temporarily maintained in the neutral condition for the purpose of increasing the engine speed and also for the purpose of improving the feeling on the vehicle during kick-down. The time required between the release of the rear clutch 17 and the engagement of the front brake 18, namely, the neutral condition maintained period, varies with initial positioning of the timing valve 260; if the initial positioning thereof is biased to the right, the neutral condition maintained period is extended while to the left, it is shortened. The initial position of the piston 262 is determined by a value of the second governor pressure acting on the left-hand end of the piston 262. Accordingly, if the vehicle speed becomes high, the neutral condition maintained period is extended. On the contrary, if the vehicle speed becomes low, the neutral condition maintained period is accordingly shortened. Therefore, the engine speed is improved to the optimum condition in accordance with the vehicle speed at the time of kick-down operation.

F. Kick-down . . . from third gear to first gear

If the vehicle driving speed at the time of kick-down operation effected is within the range of kick-down from second gear to the first gear, the first piston 172 in the 1–2 shift valve 170 is transfered to the low speed driving position together with the 2–3 shift valve 220 whereby the port 185 is closed by the land 205 and the port 184 is communicated with the discharge port 191, resulting in that line pressure supplied in the apply chamber 198 in the first servomotor 197 is discharged from the discharge port 191 through the conduit 196 and the port 184. Accordingly, the transmission mechanism is conditioned in neutral and the engine speed increases. When this engine speed increases to an extent that the rotational speed of the second intermediate shaft 13 relative to that of the driven shaft 11 corresponds with the gear ratio at the first gear drive, the one-way brake 20 is actuated to establish the low speed drive, that is first gear. If the one-way brake 20 is operated in such a manner, the optimum neutral condition maintained time can be obtainable at the time of down-shift effected at any gear ranges. However, this is susceptible to higher costs. For this reason, it is necessary to develop the timing valve of the aforementioned type which may be available at low cost.

G. Manual Valve . . . from D-position to first position, second gear drive

Hereinafter, operation for transferring the manual valve 80 from the D-position to the 1-position, namely First position, during driving the vehicle will be described.

As the manual valve 80 is operated to transfer from the D-position to the 1-position for the purpose of application of the engine brake during the operation of the vehicle at high or intermediate speed, the ports 85 and 86 are communicated with the discharge port 93 and the ports 84 and 87 with the port 83 in the manual valve 80, which in turn line pressure is supplied to the conduit 106 while line pressure within the conduits 105 and 104 is discharged from the discharge port 93.

Line pressure supplied to the port 87 as a sequential result is supplied to the port 186 in the 1–2 shift valve 170 and the port 268 in the timing valve 260 through the conduit 106 while line pressure supplied to the port 229 in the 2–3 shift valve and the port 185 in the inhibitor valve 280 is discharged from the discharge port 93 respectively through the conduit 105 and the port 86. If the vehicle is driven at high speed, line pressure in the cavity 38 of the rear clutch 17 is discharged from the discharge port 93 through the conduit 236, the port 232, and the conduit 105 together with the line pressure supplied to the port 229. At the same time, since the piston 262 in the timing valve 260 is transfered to the left-hand position as the plug 263 moves in the left-hand direction, the line pressure supplied to the release chamber 239 in the first servomotor 197 is also discharged from the port 93 through the conduit 238, the ports 265 and 266 in the timing valve 260, the conduit 236, and the port 232 in combination with the line pressure supplied from the cavity 38. Under this condition, when the vehicle driving speed exceeds an allowable value within the low speed range, the pressing force effected so as to press the piston 282 in the left-hand direction by means of the second governor pressure acting on the right-hand end of the land 287 of the piston 282 in the inhibitor valve 280 is greater than the pressing force effected so as to press the piston 282 in the right-hand direction by means of the resilient force of the spring 290, so that the piston 282 is maintained at the left-hand position and the front brake 18 is engaged by the line pressure supplied to the apply chamber 198 in the first servomotor 197 to establish the intermediate speed drive that is second gear.

H. Manual Valve . . . from D-position to first position, First gear drive

When the vehicle speed is within an allowable speed range for the low speed drive at the time of operation of the manual valve 80 from the D-position to the 1-position, the piston 282 of the inhibitor valve 280 is moved to the right-hand direction by the resilient force of the spring 290 to position as illustrated and the port 283 is subsequently closed by the land 287 while the port 284 is communicated with the discharge port 286, resulting in that the second governor pressure supplied to the timing valve 260, the 2–3 shift valve 220, the 1–2 shift valve 170, and the kick-down valve 111 is discharged from the discharge port 286 through the conduit 134. Accordingly, in the case where the vehicle is driven at the intermediate speed drive the first piston 172 and second piston 173 in the 1–2 shift valve 170 are moved to the low speed driving position, while in the case where the vehicle is driven at the high speed drive the first piston 222 and second piston 223 in the 2–3 shift valve 220 are also moved to the low speed driving position. In this case, when the first piston 172 in the 1–2 shift valve 170 moves to the low speed driving position, the port 186 is communicated with the port 187 and line pressure supplied from the conduit 106 is supplied to the apply chamber 201 in the second servomotor 200 through the ports 186 and 187 and the conduit 199 to press the piston. In such a manner, the rear brake 19 is engaged to establish the low speed drive, that is first gear and accordingly the powerful engine brake can be actuated.

Thus, the inhibitor valve 280 is adapted to discharge the governor pressure from the discharge port to establish the low speed drive when the vehicle is operated within an allowable speed range for the low speed drive, while when the vehicle is operated exceeding over the allowable speed range the establishment of the low speed drive is inhibited until the vehicle becomes operated within the allowable speed range, and thereby to establish the intermediate speed drive for the purpose of preventing the engine from being excessively rotated.

I. Of line pressure at the time of engine brake . . . Manual Valve, "1, 2, and D"

Under the condition of engine braking wherein the vehicle engine is driven by the wheels with its accelerator pedal released while the vehicle is downwardly running on the slope, the port 115 in the throttle valve 110 is closed by the land 123. Therefore, the throttle pressure in the conduits 72 and 131 becomes zero and the piston 302 of the on-off valve 300 is moved to the left by the resilient force of the spring 309 to position as illustrated in FIG. 2B. Subsequently, the port 304 is communicated with the port 305 and the second governor pressure in the conduit 162 is thus supplied to the port 57 in the regulator valve 50 through the port 304, the annular groove 308, the port 305, and the conduit 71 in sequential order to act on the pressure receiving plane 69 of the land 60 and thereby to press the piston 52 in the right-hand direction where line pressure is increased.

For this reason, the line pressure in the conduit 73 is maintained at a value proportional to the prevailing vehicle driving speed through the balance of the pressing forces, one of which is effected so as to press the piston 52 in the left-hand direction by the line pressure acting on the pressure receiving plane 68 and the other of which is effected so as to press the piston 52 in the right-hand direction by the resilient force of the spring 63 and the second governor pressure acting on the pressure receiving plane 69. Therefore, the line pressure supplied to the conduit 73 increases with increase in the throttle pressure, namely, the torque output of the vehicle engine when the vehicle wheels are driven by the engine. On the contrary, when the vehicle engine is driven by the wheels wherein the engine braking condition is established, the line pressure supplied to the conduit 73 increases with increase in the second governor pressure, namely, vehicle driving speed, so that said line pressure can be approximated to a demanded value of pressure by the friction engaging member under any driving conditions and also the pumping losses can be minimized, and thereby to perform the smooth engagement.

The automatic transmission mechanism of the present invention has been hereinbefore fully described in conjunction with a preferred embodiment with reference to the accompanying drawings. However, it should be noted that the present invention is not to be limited thereby but the scope of the following claims.

What is claimed is:

1. An automatic transmission control for use in an automotive vehicle comprising a drive shaft, a driven shaft, a hydraulic source for producing hydraulic pressure, primary means including friction engaging means for establishing a low speed power transmitting connection between said two shafts, secondary means including friction engaging means for establishing a high speed power transmitting connection between said two shafts, shift valve means hydraulically connected to said hydraulic source to control the hydraulic pressure from said hydraulic source for controlling the engaging of said primary means and releasing said secondary means when said shift valve means is in a first position and for releasing said primary means and engaging said secondary means when said shift valve means is in a second position, means establishing a first connection for applying the hydraulic pressure from said shift valve means to said secondary means when said shift valve means is in said second position and for exhausting the hydraulic pressure in said secondary means through said shift valve means when said shift valve means is in said first position, means establishing a second connection for applying the hydraulic pressure from said shift valve means to said primary means through a check valve when said shift valve means is in said second position, means establishing a third connection for exhausting the hydraulic pressure in said primary means through said shift valve means when said shift valve means is in said first position, timing valve means in said third connection for controlling the exhaust of the hydraulic pressure from said primary means through said third connection, said timing valve means including a piston having two pressure receiving surfaces thereon and being slidably disposed within said timing valve means, spring means urging said piston so as to permit the exhaust from said primary means to pass through the timing valve means, governor valve means hydraulically connected to said hydraulic source and operatively connected to one of said two shafts for producing governor pressure in proportion to the vehicle driving speed, means establishing a fourth connection for connecting said governor valve means with said timing valve means through said shift valve means, a restriction in said fourth connection between said shift valve means and said timing valve means, one of said two pressure receiving surfaces of the timing valve piston being adapted to receive the governor pressure through said fourth connection to urge said piston in the same direction as the force of said spring means when said shift valve means is in said first position, the other of said two pressure receiving surfaces of the timing valve piston being adapted to always receive the governor pressure to urge said piston in the opposite direction to the force of said spring means, whereby when said shift valve means is in said second position the piston of said timing valve means is adjustably positioned to block the exhaust of the hydraulic pressure from said primary means in accordance with the vehicle driving speed as controlled by the resultant force of said spring means and the governor pressure applied to said other of the two pressure receiving surfaces, and when said shift valve means is shifted from said second position to said first position said piston is moved to enable the exhaust of the hydraulic pressure after a lapse of time in accordance with the position of said piston and the gradually increasing governor pressure applied to said one of the two pressure receiving surfaces through said restriction.

2. An automatic transmission control for use in an automotive vehicle comprising a drive shaft, a driven shaft, first hydraulically actuable means including friction engaging means for establishing a low speed power transmitting connection between said shafts, second hydraulically actuable means including friction engaging means for establishing a high speed power transmitting connection between said shafts, a hydraulic source for supplying fluid under pressure to said first and second means, a first shifting valve for directing the flow of fluid under pressure from said source to said first means to actuate the low speed power transmitting connection, a second shifting valve for directing the flow of fluid under pressure from said source to said second means to actuate the high speed power transmitting connection, means establishing a first connection for conducting fluid from said first shifting valve to actuate said first means, means establishing a second connection for exhausting fluids from said first means to enable the actuation of said first means, means establishing a third connection for conducting fluid from said second shifting valve to actuate said second means, a governor valve operatively connected to said driven shaft for supplying fluid under pressure in proportion to the vehicle driving speed, a timing valve including a piston positioned to selectively block the second connection, said piston being movable in a first direction to enable the exhaust of fluids and being movable in a second opposite direction to preclude the exhaust of fluids, means establishing a fourth connection for supplying fluid under pressure from said governor valve directly to a first surface of said piston for forcing the piston in the second direction, a spring disposed within said timing valve to force said piston in the first direction by bearing on a second surface thereof, means establishing a fifth connection for supplying fluid under pressure from said governor valve to the second surface of said piston for forcing the piston in the first direction, said fifth connection extending through said second shifting valve and including a restricted orifice disposed between said second shifting valve and said timing valve, said second shifting valve being movably disposed to effectively open said fifth connection when in a first position corresponding to the low speed power transmitting connection and to effectively close said fifth connection when in a second position corresponding to the high speed power transmitting connection so that the governor pressure fluid commences flowing through said fifth connection after said second shifting valve is changed from the second high speed condition to the first low speed condition, whereby said timing valve piston is moved in the first direction only after a certain time has elapsed to permit the fluid in the fifth connection to bypass said restriction and with the aid of the spring force overcome the fluid pressure forces on the first surface of the piston, whereby the actuation of the first low speed power transmitting connection is delayed for a time proportional to the velocity of said vehicle at the time of initiation of the downshifting sequence.

3. An automatic transmission control for use in an automotive vehicle comprising a drive shaft, a driven shaft, a selectively engageable low speed power transmitting means including friction engaging means for establishing a first connection between said shafts, a selectively engageable high speed power transmitting means including friction engaging means for establishing a second connection between said shafts, automatic shifting means including fluid controlled valve means for selectively engaging said first and second connections, the operative connection between the driven shaft and the automatic shifting means including governor valve means having an output fluid pressure proportional to the rotational velocity of the driven shaft, and time delay means for prolonging the time span between the initiation and the completion of an automatic shifting from said second high speed connection to said first low speed connection, said delay means being operatively connected to the driven shaft for continuously varying the duration of the time delay as a function of the rotational velocity of the driven shaft at the time of the initiation of the downshifting sequence, characterized in that the time delay means comprises a movable piston operatively connected at both ends thereof with the output fluid from the governor valve means, a restricted orifice disposed adjacent one of the piston ends in the path of said output fluid and said piston being positioned to selectively block a fluid exhaust passage leading from one of said transmitting connections.

* * * * *